(No Model.) 2 Sheets—Sheet 1.

F. O. BLACKWELL.
ELECTRIC RAILWAY.

No. 454,023. Patented June 16, 1891.

WITNESSES: INVENTOR:
Francis O. Blackwell
by Bentley Knight
ATTYS.

(No Model.)　　　　　　　　　　　　　　　　　　2 Sheets—Sheet 2.
F. O. BLACKWELL.
ELECTRIC RAILWAY.
No. 454,023.　　　　　　　　　　　　　Patented June 16, 1891.
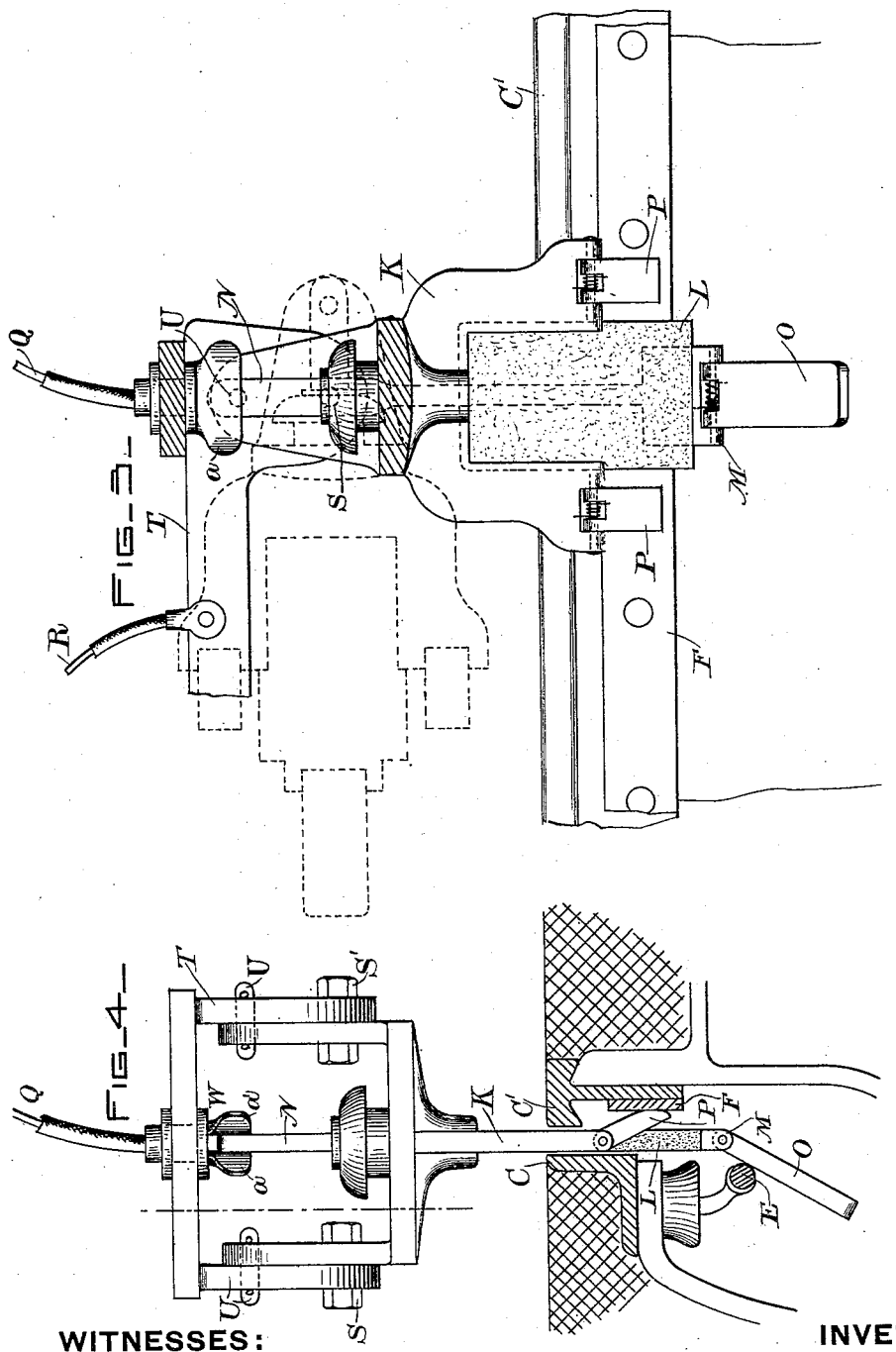
WITNESSES:　　　　　　　　　　　　　　　　INVENTOR:

UNITED STATES PATENT OFFICE.

FRANCIS O. BLACKWELL, OF BOSTON, MASSACHUSETTS, ASSIGNOR TO THE THOMSON-HOUSTON ELECTRIC COMPANY, OF CONNECTICUT.

ELECTRIC RAILWAY.

SPECIFICATION forming part of Letters Patent No. 454,023, dated June 16, 1891.

Application filed October 22, 1890. Serial No. 368,914. (No model.)

*To all whom it may concern:*

Be it known that I, FRANCIS O. BLACKWELL, a citizen of the United States, residing at Boston, in the county of Suffolk and State of Massachusetts, have invented certain new and useful Improvements in Electric Railways, of which the following is a specification.

My present invention relates to electric railways, and especially to a system in which the supply-conductor is inclosed in an underground conduit. It comprises certain details of the contact-plow and an improved arrangement aiming to avoid the sparking at the wheels and rails, which is now very common whenever the track is used as the return-branch of the motor-circuit.

In railways of the above character now in use it is customary to increase the conductivity of the circuit by connecting to the rails a supplementary conductor buried in the ground; but there is no traveling contact maintained directly between the motor and this supplementary conductor. Whenever, therefore, the presence of sand, mud, or unevenesses in the track prevents the wheels from making a good contact with the rails, sparking occurs. I avoid this without the necessity of using additional conducting material by placing the supplementary conductor in a position where it can be kept directly in circuit with the traveling motor by an auxiliary contact-maker and by connecting it with the rails, as before, at intervals along its length. In this way the supplementary conductor and rails are joined in multiple with the same pole of the motor, and if for any reason the contact through one is momentarily impaired sparking will not occur because of the second path afforded through the other.

With this explanation of the purpose of my invention, and which, it may be said, includes other features also. hereinafter to be mentioned, I pass to the description of the accompanying drawings, wherein—

Figure 1:
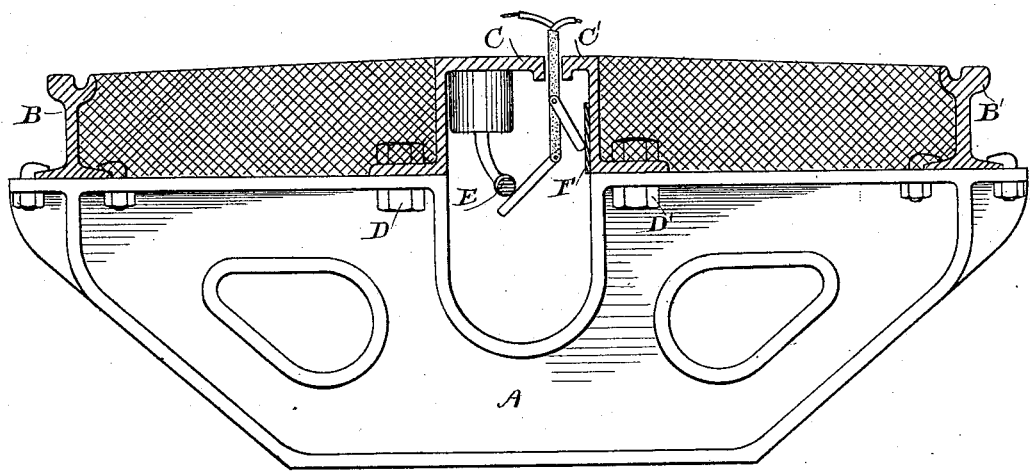
Figure 2:
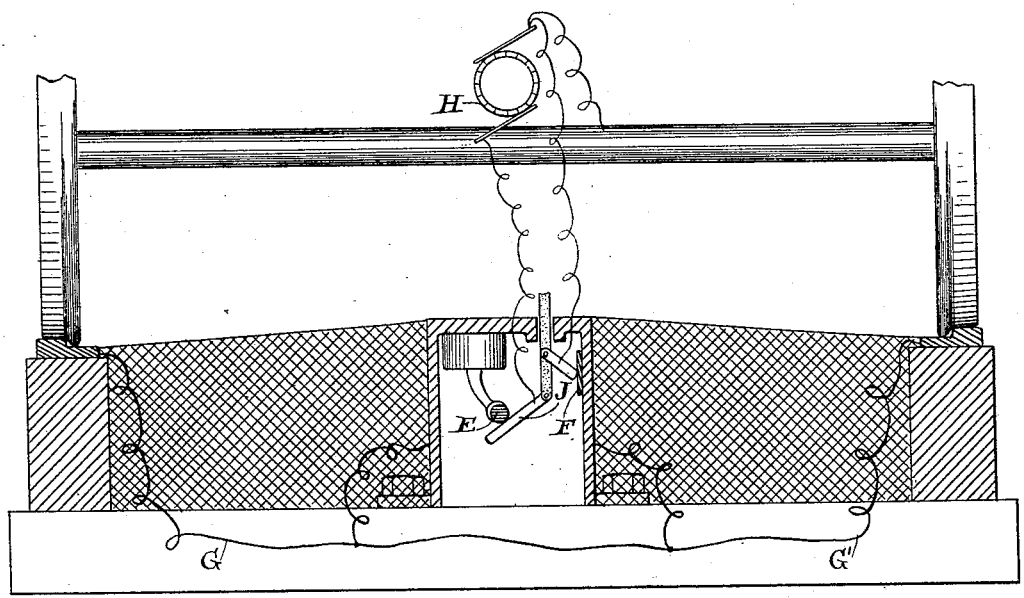

Figure 1 is a sectional view showing the conduit structure with the conductors in position therein. Fig. 2 is a similar view of a modification, and illustrates, furthermore, the manner in which the traveling motor is coupled up with the direct and return branches of the line-circuit. Fig. 3 is a side view showing a contact-plow, and Fig. 4 is an end view of the same.

The conduit structure, as seen in Fig. 1, consists of transverse yokes A, which will be placed the usual distance apart, and upon the ends of these are seated the track-rails B B'. The slot of the conduit is formed by metal slot-pieces C C', of any desired configuration, which are bolted to the yokes at D D'. Within the conduit is a supply-conductor E, supported and insulated from the conduit in any desired manner, and also a supplementary conductor F of comparatively inoxidizable metal, such as copper, silicon-bronze, or other like alloys. This latter conductor is placed in a position where it is shielded by the slot-rails from moisture entering through the slot, and may, if desired, be secured directly to the side of the slot-rail, as indicated. At all events it will be electrically connected with the metal slot-rails or yokes, and through them with the track-rails B B'.

In Fig. 2 a somewhat different form of conduit is shown, in which the transverse yokes are dispensed with. Here the slot-rails will be connected to the track-rails by special connections G G'.

The traveling motor is indicated conventionally at H, one pole of which will be kept in circuit with the insulated conductor E by means of a plow, comprising a contact-maker J, while its other pole is connected, first with the bearing-rails through the axles and wheels, and, secondly, with the bare supplementary conductor by means of an auxiliary contact-maker upon the plow.

The operation of this portion of my invention will now be readily apparent. The special conductor F is the equivalent electrically of the buried wire now used, but by bringing it into an accessible position and keeping it directly in circuit with the motor the return branch of the circuit is divided into two multiple paths. If then the contact at the wheels is impaired, more current will pass by the supplementary conductor and sparking will be avoided. A contact-plow well adapted to connect the motor terminals with the two conductors E and F is represented in the figures on the second sheet of the drawings, and this plow also contains features which will be of service in other combinations as well. It comprises a metal frame K, within and protected by which is a panel L of insulating material. A conductor M is embedded in this panel, terminating above in a conducting portion N and below in a contact-shoe O, which is connected to the conductor by a spring-hinge. To the ends of the metal frame are also hinged contact-shoes P P', of which one or more may be made use of, as desired. The insulating-panel and contact-shoe O project below the metal frame, and the latter takes current from the supply-conductor E, as in Fig. 4, which passes to the motor by the lead Q. The contact-shoes P P' engage the supplementary conductor F, and the circuit therefrom to the other pole of the motor is completed through the metal frame, hanger T, and lead R. In order to allow the plow to be automatically turned aside when meeting an obstruction in the conduit, it is pivoted on transverse pivots S S' to a hanger T, carried by the car. Frangible stop-pins U pass through the hanger and projecting arms uopn the plow to hold the latter in place. These, however, will be broken if the plow meets an obstruction and the latter will turn on the pivots S S' into the position shown in dotted lines, Fig. 3. To avoid arcing within the conduit when the plow is thus thrown out, a circuit-breaker W is provided in the motor-circuit outside of the conduit, which comprises two stiff springs $a\ a'$, flared at their ends and connected electrically to the motor, with which springs the terminal N normally engages, as in Fig. 4, the whole constituting what I term a "spring-clip." When the plow is thrown out of the conduit, the terminals of the spring-clip are moved apart and the motor-circuit interrupted at this point before the plow breaks contact with the conductors within the conduit. Whatever arcing therefore there may be will of necessity occur outside the conduit, where there is not the same danger to the plow nor liability of short-circuiting the line which would otherwise exist.

What I claim as new, and desire to secure by Letters Patent, is—

1. The combination, in an electric railway, of a supply-conductor and rail-return with an accessible bare supplementary conductor connected electrically with the rails for increasing the conductivity of the return branch of the circuit and in contact with which the traveling motor also is maintained, for the purpose set forth.

2. The combination, in an electric railway, of a traveling motor, supply-conductor, and rail-return with a supplementary conductor of comparatively inoxidizable metal, such as copper, and an auxiliary contact device traveling in engagement therewith and connecting the supplementary conductor and rails in multiple arc with one pole of the motor, as described.

3. The combination, in an electric railway, of a conduit containing an insulated supply-conductor with an accessible supplementary supply-conductor connected to the metal of the conduit and the track-rails and forming a second return-path for the motor-circuit, as set forth.

4. The combination, in an electric railway, of the track-rails in circuit with one pole of the traveling motor through the wheels of the car, and the slotted conduit containing an insulated conductor kept in circuit with the other motor-pole through a traveling contact device, with a supplementary inoxidizable conductor in the conduit connected electrically to the rails and also kept in connection by a contact-maker with that motor-pole with which the rails are in circuit, for the purpose set forth.

5. The combination, with a conduit for electric railways, comprising metallic slot-pieces, of an insulated supply-conductor kept in circuit with one pole of the traveling motor, and a conductor of comparatively inoxidizable material, such as copper, kept in circuit with the other motor-pole and connected at intervals to the track-rails, said last-named conductor being attached to the metal of the conduit and protected by the slot-rails against moisture entering through the slot.

6. The combination, in an electric railway, of the track-rails and a conduit comprising transverse metal yokes and slot-rails mounted thereon, with an insulated supply-conductor in the conduit forming one branch of the motor-circuit, and an accessible bare conductor of comparatively inoxidizable material, such as copper, protected by the slot-rails and electrically connected through the said yokes with the track-rails, the said bare conductor and track-rails being both kept in connection with one pole of the motor, and thereby together forming the second branch of the motor-circuit, as described.

7. The combination, in a contact-plow designed to travel in electrical connection with conductors of opposite polarity inclosed in a slotted conduit, of a metal frame in circuit with one pole of the motor and traveling in contact with one of said conductors, with an insulating-panel protected by said frame, and a conductor insulated by said panel which is kept in circuit with the opposite supply-conductor and second motor-pole, as described.

8. The combination, in a plow for electric railways, of the metal frame having a contact shoe or shoes connected thereto, with the insulating-panel protected by said frame, a conductor insulated by the panel, and a contact-shoe in circuit with the said conductor, as described.

9. The combination, in an electric railway, of the metal plow-frame adapted to extend through the slot of a conduit and having a contact shoe or shoes hinged thereto, with the insulating-panel and conductor projecting below the said frame, a contact-shoe connected to the conductor, and line conductors within a slotted conduit arranged one above the other in a position to be engaged by the respective contact-shoes.

10. The combination of a contact-plow for making contact with a conductor inclosed in a slotted conduit, and adapted to be automatically thrown out of its normal operative position upon meeting an obstruction, with a circuit-breaker comprising one terminal connected with the motor, and a second moving with the plow and forming part of the conducting-path therefrom, whereby the motor-circuit will be interrupted before the plow breaks contact with the supply-conductor.

11. The combination of the contact-plow pivoted upon a transverse axis and held normally in engagement with a supply-conductor inclosed in a slotted conduit by a frangible stop, with a circuit-breaker in the motor-circuit consisting of a spring-clip, one terminal of which moves with the plow, as set forth.

12. The combination of a contact device for electric railways movable into and out of operative position, with a circuit-breaker in the motor-circuit, consisting of a spring-clip, one terminal of which moves with the contact device and is brought into and out of engagement with the other terminal as the contact device moves into and away from its operative position.

13. The combination, in an electric railway, of a pivoted contact-plow, with a spring-clip in the motor-circuit, comprising one terminal in circuit with the motor and a second terminal electrically connected to the contact-maker and moving with the plow, as set forth.

In testimony whereof I have hereunto set my hand this 20th day of October, 1890.

FRANCIS O. BLACKWELL.

Witnesses:
W. M. TWOMBLY,
A. O. ORNE.